US 8,369,289 B2

(12) United States Patent
Camp, Jr. et al.

(10) Patent No.: US 8,369,289 B2
(45) Date of Patent: Feb. 5, 2013

(54) REUSE OF TRAINING SEQUENCE BETWEEN FREQUENCY-ADJACENT RADIO SIGNALS

(75) Inventors: William O. Camp, Jr., Chapel Hill, NC (US); Toby John Bowen, Durham, NC (US); Leland Scott Bloebaum, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 1210 days.

(21) Appl. No.: 12/191,798

(22) Filed: Aug. 14, 2008

(65) Prior Publication Data

US 2010/0040027 A1 Feb. 18, 2010

(51) Int. Cl.
*H04W 4/00* (2009.01)
(52) U.S. Cl. .................. 370/334; 370/310.2; 455/422.1; 375/232; 375/346
(58) Field of Classification Search ............... 370/310.2, 370/321, 326, 328–339, 345, 347, 349, 358, 370/391, 436, 442, 478, 498, 535, 536, 542–544; 455/422.1; 375/229–236, 344, 346–351
See application file for complete search history.

(56) References Cited

U.S. PATENT DOCUMENTS

| 2002/0181389 A1* | 12/2002 | Giannakis et al. | 370/208 |
| 2005/0195765 A1* | 9/2005 | Sharon et al. | 370/330 |
| 2006/0193338 A1* | 8/2006 | Zheng et al. | 370/437 |
| 2009/0154618 A1* | 6/2009 | Chang et al. | 375/346 |
| 2009/0304094 A1* | 12/2009 | Sherratt et al. | 375/260 |
| 2009/0312056 A1* | 12/2009 | Drugge et al. | 455/561 |
| 2010/0222059 A1* | 9/2010 | Pani et al. | 455/436 |

FOREIGN PATENT DOCUMENTS

EP 1545077 A2 6/2008

OTHER PUBLICATIONS

3GPP TR 25.825 v1.0.0 (May 2008), 3rd Generation Partnership Project; Technical Specification Group Radio Access Network; Dual-Cell HSDPA operation, May 2008, 3GPP, 67 pages.*
Owen, All you need to know about SINAD and its measurement using 2023 signal generators, Apr. 1999, pp. 11.*
Freescale Semiconductor, GSM Channel Equalization, Decoding, and SOVA on the MSC8126 Viterbi Coprocessor (VCOP), May 2005, 52 pages.*
3GPP TS 25.101 v8.3.0 (May 2008), 3rd Generation Partnership Project; Technical Specification Group Radio Access Network; User Equipment (UE) radio transmission and reception (FDD) (Release 8), May 2008, 3GPP, 180 pages.*

(Continued)

*Primary Examiner* — Hoon J Chung
(74) *Attorney, Agent, or Firm* — Coats & Bennett, P.L.L.C.

(57) ABSTRACT

Methods and apparatus for processing received signals in a multi-carrier system are disclosed. An exemplary method includes estimating one or more first propagation channel coefficients based on a training sequence in each of one or more first slots received over a first radio channel, equalizing signal samples from one or more second slots received over a second radio channel immediately frequency-adjacent to the first radio channel, using the first propagation channel coefficients, and demodulating user data bits from the equalized signal samples. In some embodiments, the training sequence is located at a fixed position in each of the one or more first slots and user data bits are demodulated from a directly corresponding position in each of the second slots. Improved data rates are thus achieved by constraining radio carriers in a multi-carrier system to frequency-adjacent channels and eliminating training symbols from one of the signals.

18 Claims, 5 Drawing Sheets

OTHER PUBLICATIONS

Walke, Bernhard H., "Mobile Radio Networks", Jan. 1, 2002, Wiley, XP002538544, p. 161, paragraph [3.3.7.6].

3GPP: "Digital cellular telecommunications system (Phase 2+); Feasibility study for evolved GSM/EDGE Radio Access Network (GERAN) (3GPP TR 45.192 version 7.2.0 Release 7)" ETSI TR 145 912 V 7.2.0, Jun. 1, 2007, pp. 62-112, XP002527432.

3GPP: "Digital cellular telecommunications system (Phase 2+); Feasibility study for evolved GSM/EDGE Radio Access Network (GERAN) (3GPP TR 45.192 version 7.2.0 Release 7)" ETSI TR 145 912 V 7.2.0, Jun. 1, 2007, pp. 381-381, XP002538542.

"Feasibility study for evolved GSM/EEGE Radio Access Network (GERAN)," 3GPP TR 45.912, v. 7.2.0, Mar. 20, 2007, pp. 1-24, 62-113, 382-402, www.3gpp.org/FTP/Specs/html-info/45912.htm.

U.S. Appl. No. 12/190,052, filed Aug. 12, 2008.

\* cited by examiner

REUSE OF TRAINING SEQUENCE BETWEEN FREQUENCY-ADJACENT RADIO SIGNALS

BACKGROUND

The present invention relates generally to wireless receivers and more particularly to techniques for processing training signals in dual-carrier receivers.

EDGE (Enhanced Data Rates for GSM Evolution) is a wireless protocol that provides increased capacity and data transmission rates over conventional GSM networks. EDGE uses the same time-division multiple access (TDMA) frame structure, logic channels, and 200-kHz carrier bandwidth as standard GSM networks. Thus, in most instances, implementing EDGE requires a simple upgrade to an existing GSM network.

While EDGE provides improved performance over conventional GSM, including data speeds up to 200 kb/s, further improvements to EDGE, known as "Evolved EDGE," are currently under development by the 3rd-Generation Partnership Project (3GPP). (For details, see 3GPP TR 45.912, "Feasibility study for evolved GSM/EDGE Radio Access Network (GERAN)," v. 7.2.0, Mar. 20, 2007, available as of the filing date of the present application at www.3gpp.org/FTP/Specs/html-info/45912.htm, hereinafter referred to as "Evolved EDGE Feasibility Study.") With enhancements including receiver diversity, higher-order modulation, and a new dual-carrier mode, Evolved EDGE promises data rates exceeding 1 MBit/second under some circumstances. Because evolved EDGE also uses the same TDMA frame structure, logic channels, and carrier bandwidth as GSM networks, evolved EDGE may also easily be implemented on existing GSM networks. However, new mobile terminals must be designed to fully exploit these improvements.

Despite recent advances in wireless data network technologies, wireless data applications continue to demand higher data rates, with improved reliability. Major technology upgrades, such as from GSM/EDGE to Wideband CDMA, can be prohibitively expensive in many circumstances. Thus, there remains a need for continued improvements to existing wireless data networks.

SUMMARY

In a multi-carrier system in which two or more distinct signals are sent to a mobile terminal over separate radio channels, improved data rates can be achieved by constraining the radio carriers to frequency-adjacent channels and eliminating training symbols from one of the signals. The training symbols from the adjacent channel may be used to obtain propagation channel coefficients that are used to configure equalizers for both channels. Expanded user data can be sent in the signal in which the training symbols have been omitted, in the portion of the signal normally used for the training symbols. The techniques described herein are particularly applicable to EDGE signals in an Evolved EDGE system, but are more generally applicable to other signals, such as Wideband-CDMA signals, in which multiple signals in frequency-adjacent radio carriers are transmitted to a single mobile terminal.

Thus, an exemplary method for processing received signals in a multi-carrier system includes estimating one or more first propagation channel coefficients based on a training sequence in each of one or more first slots received over a first radio channel, equalizing signal samples from one or more second slots received over a second radio channel immediately frequency-adjacent to the first radio channel, using the first propagation channel coefficients, and demodulating user data bits from the equalized signal samples. In some embodiments, the training sequence is located at a fixed position in each of the one or more first slots and user data bits are demodulated from a directly corresponding position in each of the second slots. Accordingly, higher data rates may be achieved.

In various embodiments, the equalization of the signal samples from the second channel slots includes compensating the propagation channel coefficients obtained from the first channel slots for a frequency difference between the first and second radio channels. In various other embodiments, the propagation channel coefficients are adapted based on demodulated data from the one or more first slots, and equalization of the signal samples from the second channel slots is based on the adapted propagation channel coefficients.

In some embodiments of the present invention, the equalization of the second channel slots is performed according to the above techniques in a first processing mode, responsive to the receipt of an equalization mode signal received over one of the first or second radio channels. These embodiments may further comprise a second processing mode, in which one or more second propagation channel coefficients are estimated based on training sequences in one or more third slots received over the second radio channel, and equalizing signal samples from one or more of the third slots, using the second propagation channel coefficients.

Wireless receivers corresponding to the above methods are also disclosed. Of course, those skilled in the art will appreciate that the present invention is not limited to the above contexts or examples, and will recognize additional features and advantages upon reading the following detailed description and upon viewing the accompanying drawings.

DETAILED DESCRIPTION

As noted above, one of the improvements provided in Evolved EDGE is a dual-carrier mode in which two distinct EDGE signals, transmitted on separate radio carriers, are used for downlink (base station-to-mobile) transmissions. Although present development is focused on this dual-carrier mode, 3GPP has left open the possibility for future development of an expanded multi-carrier feature, utilizing more than two simultaneous carriers.

The basic concept of Evolved EDGE dual-carrier transmission is quite simple: one or more time slots in each of two independent carrier frequencies are allocated to a single mobile terminal, thus allowing a doubling of the downlink data rates. The receiving mobile terminal demodulates the transmitted data using two parallel receiver branches.

According to the Evolved EDGE Feasibility Study cited above, dual-carrier EDGE can be viewed as simply an extension to existing multi-slot allocation schemes, in that a multi-slot allocation is permitted to span two carriers. Thus, user data can be split between the multiple slots, over the multiple carriers, in the same manner currently used for multi-slot transmission. Accordingly, while existing single-carrier terminal designs must be modified to include receivers configured to receive two distinct EDGE signals, conventional Radio Link Control (RLC) and Medium Access Control (MAC) protocols may continue to be used without major modifications. Of course, some changes to these protocols may be necessary—for instance, the Evolved EDGE Feasibility Study suggests that the RLC window size may need to be increased to handle the increased capacity. Further, segmentation and re-assembly functions must be able to accommodate the fact that simultaneously received timeslots, from different carriers, will have the same timeslot number.

Figure 1:
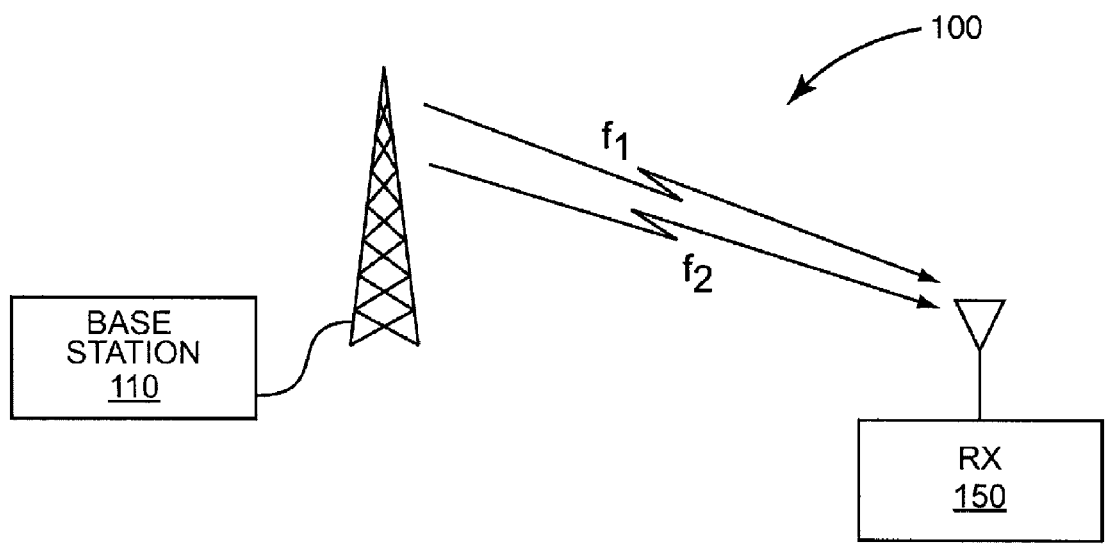
FIG. 1 illustrates an exemplary wireless communications system employing a dual-carrier transmission mode.

A simplified schematic of a dual-carrier EDGE system 100 is illustrated in FIG. 1, in which base station 110 transmits data to dual-carrier wireless receiver 150 over two distinct carrier frequencies, $f_1$ and $f_2$. Of course, wireless receiver 150 is coupled to an EDGE transmitter as well (not shown), and may be part of a wireless handset, a wireless-equipped personal data assistant (PDA) or portable computer, a PC card or other module for installation in a portable computer, a fixed wireless terminal, a telematics module, or the like.

Figure 2:
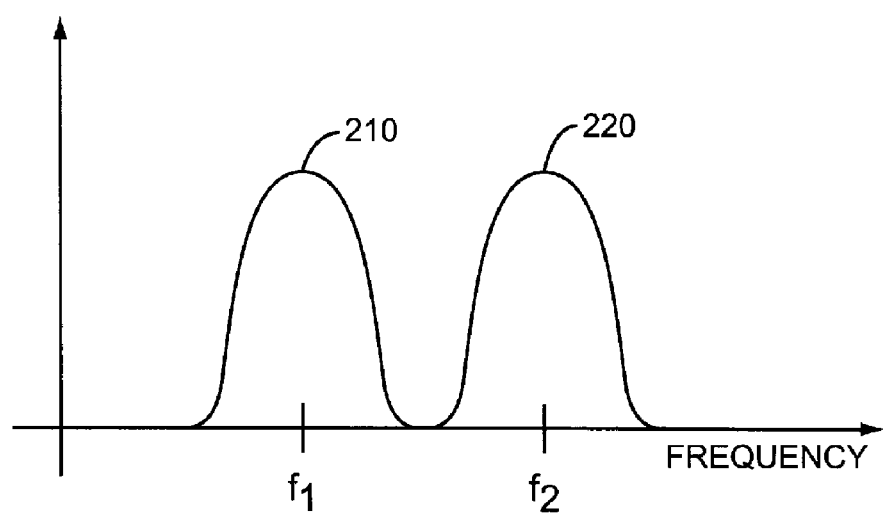
FIG. 2 illustrates frequency-adjacent channels.

As presently planned for Evolved EDGE systems, the radio channels $f_1$ and $f_2$ allocated for a particular transmission may be any of the channels available for use by the base station and may thus be separated by a large frequency difference. However, as discussed in a co-pending patent application titled "Evolved EDGE Receiver," filed by the present inventors on Aug. 12, 2008 and having serial number U.S. Ser. No. 12/190,052, the entire contents of which are incorporated by reference herein, it may be desirable in some circumstances to restrict the two (or more) carriers allocated to a given mobile terminal to be frequency-adjacent. This is illustrated in FIG. 2, where first and second EDGE signals 210 and 220 are in adjacent radio channels. Thus, the carrier frequencies (nominal center frequencies) $f_1$ and $f_2$ are separated by only the spacing of a single channel, 200 kHz for EDGE systems.

Generally speaking, signals transmitted from a single base station to a single mobile station over each of the frequency-adjacent channels pictured in FIG. 2 will experience correlated propagation conditions. Many communication signals include training sequences, or sequences of pilot symbols, for use by the receiver in estimating the propagation channel coefficients characterizing the channel, and compensating the signal accordingly, e.g., by using a linear equalizer. Because adjacent signals transmitted over the same path are likely to have similar propagation channel coefficients, the quantity of training or pilot symbols may be reduced, as shown below.

Figure 3A:
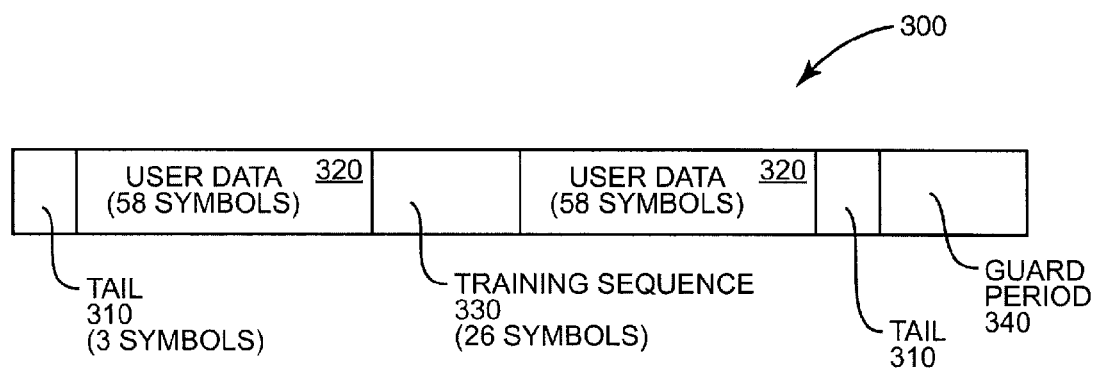
FIGS. 3A and 3B illustrate a normal EDGE burst and an exemplary expanded user data burst, respectively.

FIG. 3A illustrates the structure of a normal slot, or "burst," in an EDGE system. Each burst 300 begins and ends with a "tail" field 310, comprising three "zero" symbols (nine bits). The tail 310 at the end of the burst is followed by a guard period 340, which is 8.25 symbols long. Burst 300 also includes two user data fields 320, each comprising 58 symbols. In a conventional EDGE system, these symbols may carry up to three bits each (using 8-PSK modulation), for a total of 348 user data bits. With the higher-order modulation schemes anticipated in Evolved EDGE, each of these user data symbols may correspond to 4 bits (16-QAM—yielding 464 bits/slot) or 5 bits (32-QAM—yielding 580 bits/slot), although the latter is unlikely to be achieved except under the best signal conditions. Finally, the normal burst 300 includes a training sequence 330, which comprises a known sequence of 26 symbols and is positioned in the middle of the burst. This training sequence is used by a receiver to characterize the channel conditions, e.g., by computing one or more complex propagation channel coefficients for use in compensating the received signal prior to demodulation.

Figure 3B:
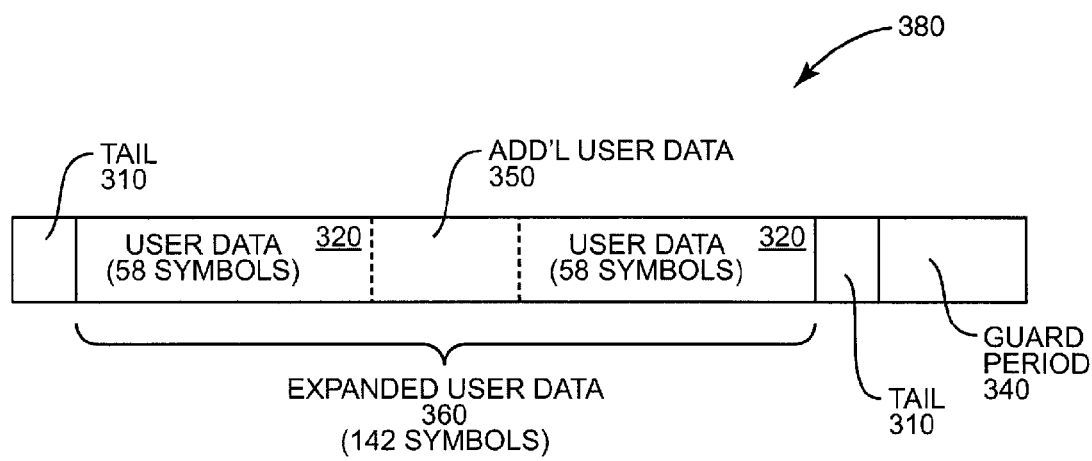

In some embodiments of the present invention, the training sequence 330 can be eliminated entirely from the bursts transmitted on one of the adjacent channels. This is pictured in FIG. 3B, which illustrates an expanded data burst 380. Like the normal burst 300, expanded data burst 380 includes beginning and ending tails 310. Expanded data burst 380 is also separated from other bursts by guard period 340. In addition to the normal data payload carried in user data fields 320, however, expanded data burst 380 carries additional user data 350, in the location corresponding to the position occupied by the training sequence 330 in normal busts. Thus, expanded data burst 380 includes an expanded user data field 360, comprising 142 symbols.

The expanded user data field 360 thus carries about 22% more encoded user data than the user data fields 320 in a normal burst. In an exemplary dual-carrier system according to some embodiments of the present invention, one channel carries normal bursts, while the adjacent channel carries expanded data bursts, resulting in an overall increase in throughput of about 11%. Those skilled in the art will appreciate that the techniques described herein may be extended to more than two carriers, thus potentially yielding even higher improvements in data rates, under appropriate circumstances (e.g., where the channels exhibit low delay spreads).

Figure 4:
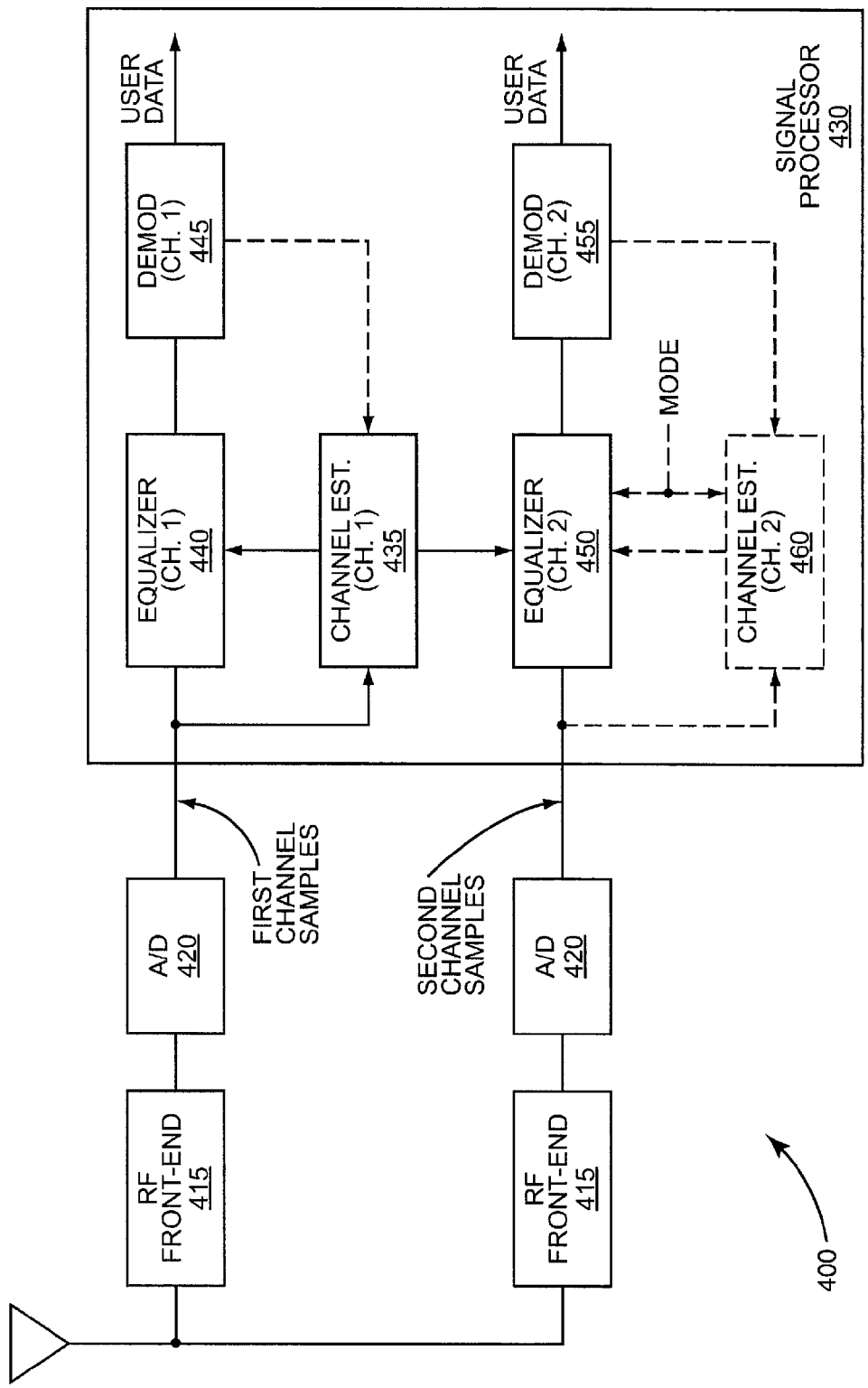
FIG. 4 is a block diagram for a dual-carrier wireless receiver according to some embodiments of the present invention.

FIG. 4 provides a schematic diagram illustrating major functional blocks of a wireless receiver according to some embodiments of the present invention. Receiver 400, which is configured to process a dual-carrier signal, includes first and second RF front-ends 415. These front-end circuits, which may include, for example, conventional low-noise amplifiers, downconverting mixers, and the like, are tuned to receive signals in first and second frequency-adjacent channels. Although illustrated in FIG. 4 as completely distinct functional blocks, those skilled in the art will appreciate that RF front-ends 415 may in some embodiments share certain circuitry, such as a low-noise amplifier, pre-selector filters, and the like. Generally speaking, however, first RF front-end 415 is configured to downconvert a received signal at a first frequency $f_1$, in a first radio channel, to an intermediate frequency (IF) or baseband frequency for conversion into digital form by a first A/D converter 420. Second RF front-end 415 is similarly configured to downconvert a distinct received signal at a second frequency $f_2$, in a radio channel adjacent to the first radio channel, to IF or baseband for conversion into digital form by a second A/D converter 420.

Samples from the first channel are supplied to channel estimation circuit 435 and to equalizer circuit 440, which are part of signal processing unit 430. The training sequence in the first channel signal is detected and used to calculate one or more propagation channel coefficients, according to conventional techniques. These propagation channel coefficients are used to tune the equalizer circuit 440, which may comprise any of a variety of conventional equalizer circuits. Some embodiments may include adaptation or decision-feedback equalization, in which the equalizer coefficients are adapted within a single burst, or across several bursts, or simply be smoothed (e.g., filtered) across two or more bursts. Accordingly, an optional feedback path between detector/demodulator 445 and channel estimation circuit 435 is shown; in such embodiments channel estimation circuit 435 further serves to adapt the equalizer coefficients in accordance with the feedback.

In a similar fashion, samples from the second channel are supplied to equalizer circuit 450, which may be structurally identical to equalizer 440 in some embodiments, although it need not be. Bursts received in the second channel, however, do not include a training sequence at all (at least in a first mode, as will be discussed in more detail below). Thus, the propagation channel coefficients for equalizer circuit 450 are supplied from the channel estimation circuit 435 from the first receiver branch. Accordingly, the signal samples for slots received over the second channel are equalized using the propagation channel coefficients obtained from slots received over the first channel. As a result, the slots received over the second channel may comprise additional user data, located in a portion of the slot corresponding to the position of the training sequence in "normal" slots. Demodulating circuit 455 thus demodulates user data bits from the "normal" user data fields of slots received over the second channel, as well as the additional user data bits carried in the location normally occupied by the training sequence.

As noted above, omitting the training sequence in one of two adjacent-channel radio signals can allow a significant improvement in data throughput. However, in some cases the signal conditions may vary such that it is sometimes undesirable to drop the training sequence in the adjacent channel. Thus, some embodiments of a wireless receiver according to the present invention may be configured to operate in two distinct modes. In the first mode, which may in some circumstances be initiated upon a determination that the channel conditions are suitable, the receiver operates as described above, i.e., with equalizer coefficients determined from the training sequence included in slots of the first radio channel and with expanded data bursts on slots received over the adjacent channel. In the second mode, which may be entered upon determining that channel conditions no longer support expanded data mode, training sequences are included in slots received over the second channel as well, and may be used by the second receiver branch to determine channel-specific channel estimates for equalizing these slots. In other words, during this second mode, "normal" bursts are received over the second radio channel and the included training sequences used to generate equalizer coefficients for the second channel samples. This is illustrated in FIG. 4, where a "MODE" signal (indicated as optional in FIG. 4 with a dashed line) selects between the operation of a first mode, i.e., an expanded data mode, in which the equalizer circuit 450 for the second channel is configured according to channel estimates produced by the first channel estimation circuit 435, and the operation of a second mode, in which the equalizer circuit 450 is configured according to channel estimates provided by channel estimation circuit 460 (also indicated as optional in FIG. 4) based on samples from the second radio channel.

Those skilled in the art will appreciate that the mode change discussed above may be triggered by explicit signaling from the base station in some embodiments. For example, a control channel signal may be targeted to the mobile terminal to indicate whether subsequent slots in one of the adjacent signals will include training signals or not. This control channel signal may effectively serve as an "equalization mode" signal, indicating whether equalization of the second channel should be based on channel estimates from the second channel or not. Those skilled in the art will also appreciate that the designations "first channel" and "second channel" in the preceding discussion are arbitrary. In various embodiments, either of the adjacent channels may include a training sequence, while the other does not. In some systems, this may be according to a pre-determined rule, such as a rule indicating that the lower-frequency channel always includes a training sequence, or a rule indicating that the upper-frequency channel always includes a training sequence. In other embodiments, signaling information sent from the base station to the mobile station may indicate which of the multiple carrier signals includes (or omits) a training sequence. In any event, this signaling, which in some cases may require only a single bit, may be performed using conventional means. For instance, one or more unused bits in pre-defined logical control channel structures may be used to indicate whether an expanded data mode should be initiated, or a new field for a logical control channel or other control data structure may be defined.

Figure 5:
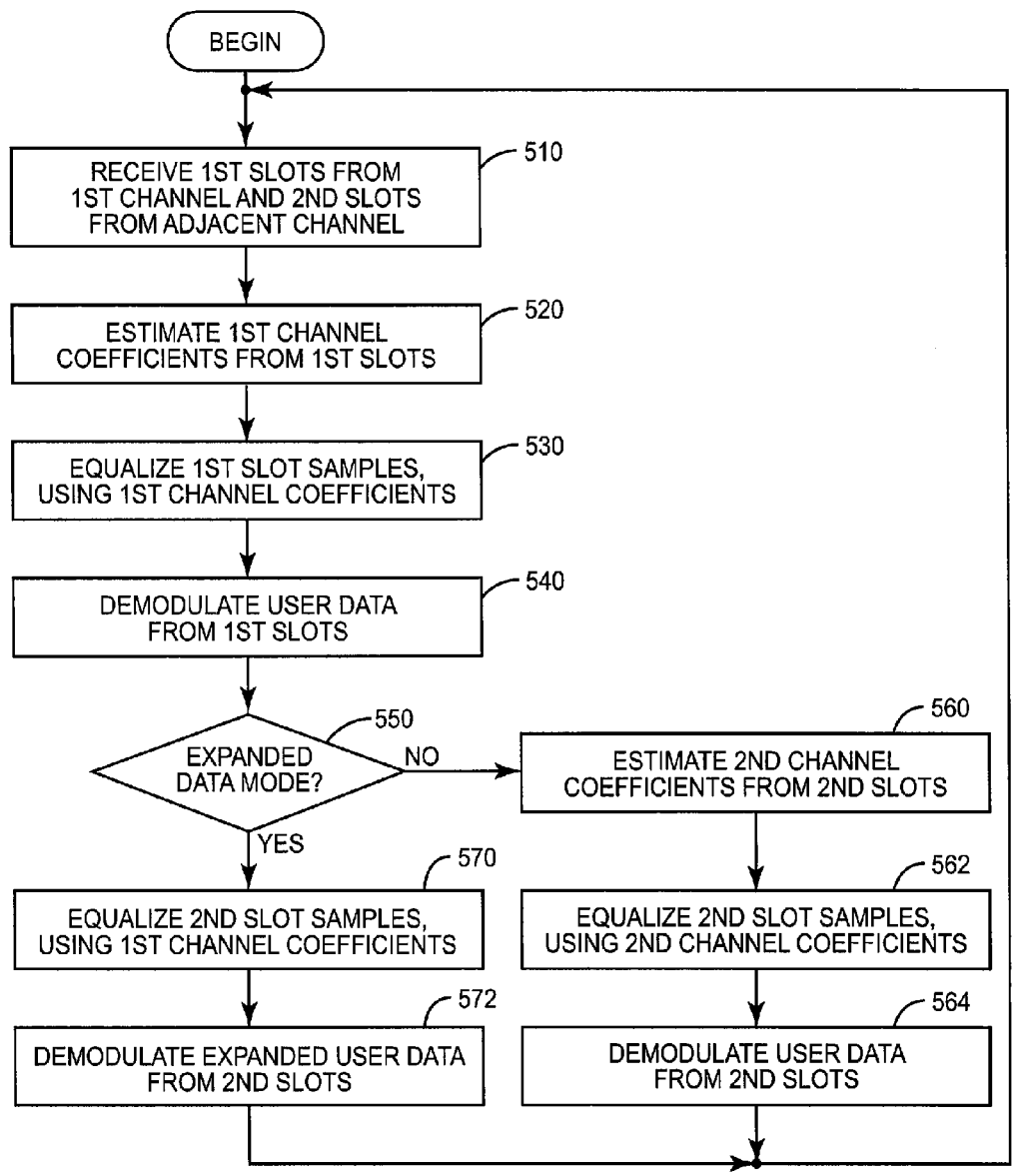
FIG. 5 is a process flow diagram illustrating an exemplary method for processing received signals in a wireless receiver.

With the preceding discussion in mind, an exemplary process flow for processing received signals in a dual-carrier mode is illustrated in FIG. 5. The illustrated process begins with the reception of first slots from the first radio channel and second slots from the second radio channel, as shown at block 510. The first and second radio channels are frequency-adjacent, as discussed above. Thus, in an EDGE system, the first and second radio channels are separated by 200 kHz. In other systems, such as a Wideband-CDMA system, the channel spacing may be considerably larger.

Next, digital samples from one or more slots of the first channel are used to estimate one or more first channel coefficients, as shown at block 520. At block 530, these first channel coefficients are used to equalize the samples from the first channel slots. At block 540, user data is recovered from the equalized first slot samples. Each of these operations on the first channel slots may be performed according to conventional techniques, which may depend on the type of signal being processed. In the case of an EDGE signal, for example, the training sequence 330 is detected, and the received samples effectively compared to the known values for the sequence to determine the channel coefficients and equalizer tap coefficients. Various methods for estimating propagation channel coefficients for signals of various types have been developed and are well known to those skilled in the art; one such method for GSM/EDGE signals, for example, is described in U.S. Pat. No. 7,079,601, issued to Shousheng He on Jul. 18, 2006, the entire contents of which are incorporated herein by reference.

The processing of digital samples of slots received over the second channel depends on whether the receiver is in an expanded data mode or not, as shown at block 550. As discussed above, in some embodiments a dual-carrier receiver may receive an equalization mode signal, i.e., a control signal indicating whether the receiver should process the second channel slots according to an expanded data mode or not. If not, then slots received over the second channel include training sequences and may be processed according to conventional means. Thus, as shown at blocks 560, 562, and 564, channel coefficients for the second radio channel are estimated, using samples from the second channel slots. Those channel coefficients are used to configure a second equalizer, which equalizes the second slot samples prior to demodulation of user data from the second channel slots.

If the receiver is currently operating in expanded data mode, on the other hand, the second channel equalizer is instead configured based on the channel estimates obtained from the first channel slots, as shown at block 570. Since training symbols are thus not required in the second channel slots, the locations in the second channel slots normally dedicated to training symbols may instead carry expanded user data, which may be demodulated by the receiver as shown at block 572.

Although the process flow illustrated in FIG. 5 is generally applicable to the burst structures described with respect to FIG. 3 and the receiver structure described with respect to FIG. 4, those skilled in the art will appreciate that the method illustrated in FIG. 5 and its variants may be implemented using any of a broad variety of receiver structures having details different than those discussed earlier, for a variety of signal structures corresponding to any of several wireless protocols. Those skilled in the art will further appreciate that processing of the received slots may proceed in a different order than pictured, in some embodiments. For instance, in some embodiments the estimation of channel coefficients from the second channel slots pictured at block 560 may be performed, as needed, in parallel with the estimation of the first channel coefficients (of block 520). Similarly, the equalization of the second channel slot samples and the demodulation of the second channel user data, whether in expanded mode or not, may be performed in some embodiments in parallel with the corresponding operations for the first channel. Those skilled in the art will appreciate that further variations of these procedures are possible.

Figure 6:
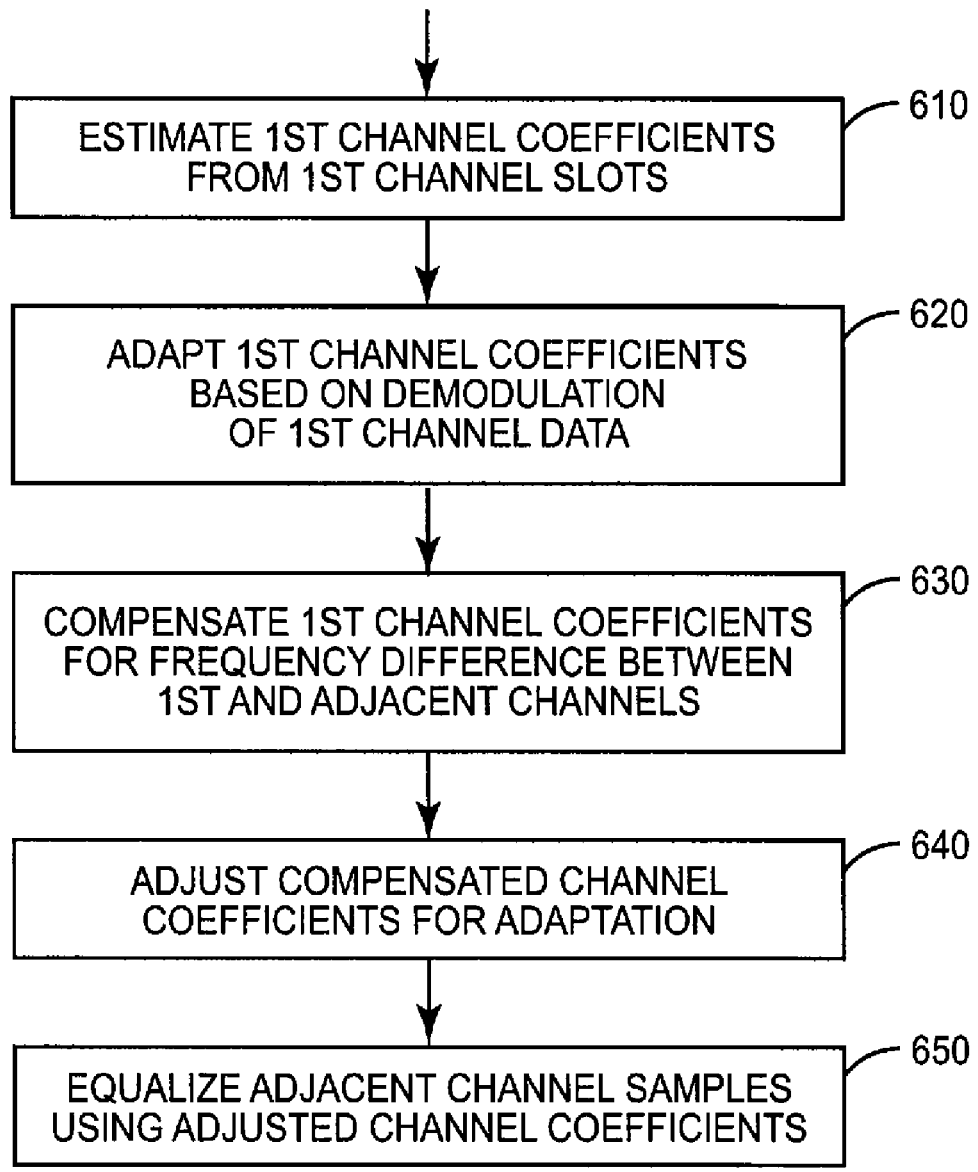
FIG. 6 is another process flow diagram illustrating exemplary signal processing methods according to some embodiments of the present invention.

The process flow diagram of FIG. 6 illustrates additional details of a method for processing received dual-carrier signals according to some embodiments of the invention. The process begins at block 610 with the estimation of first channel coefficients from sample data for first channel slots, i.e., slots containing training symbols. At block 620, these first channel coefficients are adapted, based on the demodulation of one or more slots. In some embodiments, this adaptation may be limited to a single slot. For example, the channel coefficients may be adapted in both forward and backward directions across an EDGE burst, to account for time-variation in the channel conditions prior to and after the training sequence, which is in the middle of the burst. In other embodiments, the adaptation may extend across several slots.

As previously discussed, in an expanded data mode the slots received over the second channel may not include any training sequence at all. In the methods discussed above, these slots are equalized based on the channel coefficients obtained from the first channel slots. Under some circumstances it may be desirable to compensate these channel coefficients for at least the frequency difference between the first and second (frequency-adjacent) channels, and basing the equalization of the second channel slots on the compensated channel coefficients. This compensation is illustrated in FIG. 6 at block 630. Furthermore, the results from adaptation performed during processing of first channel slots may also be transferred to the second channel processing. This is shown at block 640, which illustrates the adjustment of the (frequency-compensated) channel coefficients based on the adaptation performed on the first channel slots. Thus, as shown at block 650, the second channel slots are equalized based on channel coefficients that have been frequency compensated, to account for the frequency difference between channels, and adjusted to account for at least a portion of the adaptation that was performed for the first channel slots.

Those skilled in the art will appreciate that the processes described above broadly illustrate methods for processing multi-carrier received signals, in which slots received in at least a first one of two or more frequency-adjacent radio channels include training symbols while slots from at least a second one of the adjacent channels do not. The methods described generally include the estimation of propagation channel coefficients based on a training sequence in each of one or more slots received over the first radio channel, followed by the equalization of signal samples from slots received over the second radio channel, using the propagation channel coefficients determined from the first channel. User data bits may then be demodulated from the equalized signal samples. In some embodiments, these user data bits include expanded user data bits recovered from a position in one or more of the second channel slots directly corresponding to the fixed position in the first channel slots occupied by the training sequence.

In addition to the methods described above, a multi-carrier receiver apparatus has also been generally described. Those skilled in the art will appreciate that only those features of a wireless receiver apparatus necessary for an understanding of the present invention have been described in any detail. Details for the remaining features may vary according to the specific application, including the specific types of radio signal modulation, channelization, and slot structures employed, and will be well known to the skilled practitioner. In general, the receivers described herein include at least two receiver branches: a first receiver branch configured to receive one or more first slots over a first radio channel and a second receiver branch configured to receive one or more second slots over a second radio channel immediately frequency-adjacent to the first channel. An exemplary receiver according to one or more embodiments of the invention further includes a signal processing unit configured to estimate one or more first propagation channel coefficients based on a training sequence in each of the one or more first slots, equalize signal samples from the one or more second slots, using the first propagation channel coefficients, and demodulate user data bits from the equalized received signal samples. Of course, variants of the receiver described above may be configured to carry out one or more of the various methods described herein.

Those skilled in the art will appreciate that several of the functional elements of the wireless receiver 400 described above, including, but not limited to, the several functions of the signal processing unit 430, may be implemented on one or more microcontrollers, microprocessors, or digital signal processors. Several of all of these functional elements may be implemented together, i.e., using a shared processor element, or one or more of the functional elements may be implemented separately, with appropriate hardware and/or software interfaces between the functional blocks. Several of these elements may be implemented on a application-specific integrated circuit (ASIC) designed for use in a wireless receiver 400, which ASIC may include one or several programmable elements. One or more of the functional elements of receiver 400 above may be provided through the use of dedicated hardware, on-board an ASIC or off, or may be implemented with hardware capable of executing software, in association with the appropriate software or firmware. Furthermore, those skilled in the art will appreciate that terms such as "processor," "controller," and "signal processing unit" do not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Those skilled in the art will appreciate the cost, performance, and maintenance tradeoffs inherent in these design choices.

The present invention may, of course, be carried out in other ways than those specifically set forth herein without departing from essential characteristics of the invention. Embodiments of the present invention thus include, but are not limited to:

(a) A method for processing received signals in a wireless receiver, the method comprising: estimating one or more first propagation channel coefficients based on a training sequence in each of one or more first slots received over a first radio channel; equalizing signal samples from one or more second slots received over a second radio channel immediately frequency-adjacent to the first radio channel, using the first propagation channel coefficients; and demodulating user data bits from the equalized signal samples.

(b) A method as in (a), wherein the training sequence is located at a fixed position in each of the one or more first slots, and wherein demodulating user data bits from the equalized received signal samples comprises demodulating user data bits from a directly corresponding position in each of the second slots.

(c) A method as in (a), wherein each of the first and second slots comprises an EDGE signal.

(d) A method as in (a), wherein each of the first and second slots comprises a Wideband-CDMA signal.

(e) A method as in (a), wherein equalizing signal samples from one or more second slots received over the second radio channel comprises compensating the first propagation channel coefficients for a frequency difference between the first and second radio channels.

(f) A method as in (a), further comprising adapting the one or more first propagation channel coefficients based on demodulated data from the one or more first slots, wherein equalizing signal samples from one or more of the second slots received over the second radio channel is based on the adapted first propagation channel coefficients.

(g) A method as in (a), further comprising receiving an equalization mode signal via one of the first and second radio channels, wherein said equalizing is performed in a first processing mode responsive to said equalization mode signal.

(h) A method as in (g), further comprising, in a second processing mode: estimating one or more second propagation channel coefficients based on training sequences in one or more third slots received over the second radio channel; and equalizing signal samples from one or more of the third slots, using the second propagation channel coefficients.

(i) A multi-carrier receiver apparatus, comprising: a first receiver branch configured to receive one or more first slots over a first radio channel; a second receiver branch configured to receive one or more second slots over a second radio channel immediately frequency-adjacent to the first radio channel; and a signal processing unit configured to: estimate one or more first propagation channel coefficients based on a training sequence in each of the one or more first slots; equalize signal samples from the one or more second slots, using the first propagation channel coefficients; and demodulate user data bits from the equalized received signal samples.

(j) A multi-carrier receiver apparatus as in (i), wherein the signal processing unit is configured to process the training sequence from a fixed position in each of the one or more first slots and to demodulate user data bits from a directly corresponding position in each of the second slots.

(k) A multi-carrier receiver apparatus as in (i), wherein the first and second receiver branches are configured to receive slots from first and second EDGE signals, respectively.

(l) A multi-carrier receiver apparatus as in (i), wherein the first and second receiver branches are configured to receive slots from first and second Wideband-CDMA signals, respectively.

(m) A multi-carrier receiver apparatus as in (i), wherein the signal processing unit is configured to equalize signal samples from the one or more second slots by compensating the first propagation channel coefficients for a frequency difference between the first and second radio channels.

(n) A multi-carrier receiver apparatus as in (i), wherein the signal processing unit is further configured to adapt the one or more first propagation channel coefficients based on demodulated data from the one or more first slots and to equalize the signal samples from the one or more second slots using the adapted first propagation channel coefficients.

(o) A multi-carrier receiver apparatus as in (i), wherein the signal processing unit is configured to receive an equalization mode signal via one of the first and second radio channels and to equalize signal samples from the one or more second slots using the first propagation channel coefficients in a first processing mode, responsive to said equalization mode signal.

(p) A multi-carrier receiver apparatus as in (o), wherein the signal processing unit is further configured to, in a second processing mode: estimate one or more second propagation channel coefficients based on training sequences in one or more third slots received over the second radio channel; and equalize signal samples from one or more of the third slots, using the second propagation channel coefficients.

(q) A method in a wireless transmitter for transmitting a multi-carrier signal, the method comprising: selecting a first radio channel and a frequency-adjacent second radio channel, for transmitting one or more first bursts and one or more second bursts, respectively, to a remote wireless receiver; transmitting a pre-determined training sequence at a fixed position in each of the first bursts; and transmitting user data in a directly corresponding position in each of the second bursts.

The present embodiments are thus to be considered in all respects as illustrative and not restrictive, and all changes coming within the meaning and equivalency range of the appended claims are intended to be embraced therein.

What is claimed is:

1. A method for processing received signals in a wireless receiver, the method comprising:
   estimating one or more first propagation channel coefficients based on a training sequence in each of one or more first slots received over a first radio channel;
   equalizing signal samples from one or more second slots received over a second radio channel immediately frequency-adjacent to the first radio channel, using the first propagation channel coefficients; and
   demodulating user data bits from the equalized signal samples.

2. The method of claim 1, wherein the training sequence is located at a fixed position in each of the one or more first slots, and wherein demodulating the user data bits from the equalized received signal samples comprises demodulating the user data bits from a directly corresponding position in each of the second slots.

3. The method of claim 1, wherein each of the first and second slots comprises an EDGE signal.

4. The method of claim 1, wherein each of the first and second slots comprises a Wideband-CDMA signal.

5. The method of claim 1, wherein equalizing signal samples from one or more second slots received over the second radio channel comprises compensating the first propagation channel coefficients for a frequency difference between the first and second radio channels.

6. The method of claim 1, further comprising adapting the one or more first propagation channel coefficients based on demodulated data from the one or more first slots, wherein equalizing signal samples from one or more of the second slots received over the second radio channel is based on the adapted first propagation channel coefficients.

7. The method of claim 1, further comprising receiving an equalization mode signal via one of the first and second radio channels, wherein said equalizing is performed in a first processing mode responsive to said equalization mode signal.

8. The method of claim 7, further comprising, in a second processing mode:
   estimating one or more second propagation channel coefficients based on training sequences in one or more third slots received over the second radio channel; and
   equalizing signal samples from one or more of the third slots, using the second propagation channel coefficients.

9. The method of claim 1, wherein the one or more first slots correspond to a first burst and the one or more second slots correspond to a second burst, and wherein the second burst does not include any training sequence.

10. A multi-carrier receiver apparatus, comprising:
   a first receiver branch configured to receive one or more first slots over a first radio channel;
   a second receiver branch configured to receive one or more second slots over a second radio channel immediately frequency-adjacent to the first radio channel; and
   a signal processing unit comprising one or more processing circuits configured to:
      estimate one or more first propagation channel coefficients based on a training sequence in each of the one or more first slots;
      equalize signal samples from the one or more second slots, using the first propagation channel coefficients; and
      demodulate user data bits from the equalized received signal samples.

11. The multi-carrier receiver apparatus of claim 10, wherein the one or more processing circuits of the signal processing unit are configured to process the training sequence from a fixed position in each of the one or more first slots and to demodulate the user data bits from a directly corresponding position in each of the second slots.

12. The multi-carrier receiver apparatus of claim 10, wherein the first and second receiver branches are configured to receive slots from first and second EDGE signals, respectively.

13. The multi-carrier receiver apparatus of claim 10, wherein the first and second receiver branches are configured to receive slots from first and second Wideband-CDMA signals, respectively.

14. The multi-carrier receiver apparatus of claim 10, wherein the one or more processing circuits of the signal processing unit are configured to equalize signal samples from the one or more second slots by compensating the first propagation channel coefficients for a frequency difference between the first and second radio channels.

15. The multi-carrier receiver apparatus of claim 10, wherein the one or more processing circuits of the signal processing unit are further configured to adapt the one or more first propagation channel coefficients based on demodulated data from the one or more first slots and to equalize the signal samples from the one or more second slots using the adapted first propagation channel coefficients.

16. The multi-carrier receiver apparatus of claim 10, wherein the one or more processing circuits of the signal processing unit are configured to receive an equalization mode signal via one of the first and second radio channels and to equalize signal samples from the one or more second slots using the first propagation channel coefficients in a first processing mode, responsive to said equalization mode signal.

17. The multi-carrier receiver apparatus of claim 16, wherein the one or more processing circuits of the signal processing unit are further configured to, in a second processing mode:
   estimate one or more second propagation channel coefficients based on training sequences in one or more third slots received over the second radio channel; and
   equalize signal samples from one or more of the third slots, using the second propagation channel coefficients.

18. The multi-carrier receiver apparatus of claim 10, wherein the one or more first slots correspond to a first burst and the one or more second slots correspond to a second burst, and wherein the second burst does not include any training sequence.

\* \* \* \* \*